United States Patent [19]

Kaul et al.

[11] 4,176,276
[45] Nov. 27, 1979

[54] PHOTOELECTRIC INCIDENT LIGHT DISTANCE MEASURING DEVICE

[75] Inventors: Dietmar Kaul, Solms; Jöerg Willhelm, Nauborn, both of Fed. Rep. of Germany

[73] Assignee: Ernst Leitz Wetzlar GmbH, Wetzlar, Fed. Rep. of Germany

[21] Appl. No.: 854,380

[22] Filed: Nov. 23, 1977

[30] Foreign Application Priority Data

Nov. 25, 1976 [DE] Fed. Rep. of Germany ....... 2653545
Mar. 31, 1977 [DE] Fed. Rep. of Germany ....... 2714324

[51] Int. Cl.² .............................................. H01J 3/14
[52] U.S. Cl. ................................ 250/237 G; 356/356; 356/395
[58] Field of Search ................... 250/237 G; 356/356, 356/395

[56] References Cited

U.S. PATENT DOCUMENTS

| | | | |
|---|---|---|---|
| 3,344,700 | 10/1967 | Brake | 250/237 G |
| 3,351,768 | 11/1967 | Cooke | 250/237 G |
| 4,049,965 | 9/1977 | Pettigrew | 250/237 G |
| 4,051,367 | 9/1977 | Sayce et al. | 250/237 G |
| 4,079,252 | 3/1978 | Brake | 250/237 G |

*Primary Examiner*—Robert Segal
*Attorney, Agent, or Firm*—Schwartz, Jeffery, Schwaab, Mack, Blumenthal & Koch

[57] ABSTRACT

Disclosed is a photoelectric incident light distance measuring device, comprising a light source; a reflecting scale grating; a reference grating with a lattice constant differing from that of the scale grating; the reference grating being transparent and displaceable with respect to the scale grating; an air space between the two gratings; and a plurality of photoelectric receivers placed at intervals in the direction of the distance to be measured for scanning the scale grating through the reference grating whereby vernier strips are produced, and wherein at least two of the photoelectric receivers are arranged approximately at a distance "x", measured in the direction of the light, from the grating with the larger optically effective lattice constant, wherein:

$$x = a/v$$

with
- $a$ = optically effective air space between the reference and scale gratings;
- $v = d_M/(y + d_M)$ = distortion factor;
- $y$ = distance of the vernier strips produced by the two gratings;

and with
- $d_M$ as the optically effective lattice constant of the scale grating, related to the optically effective lattice constant $d_R$ of the reference grating by the relationship $$d_R = d_M (1 \pm v).$$

6 Claims, 8 Drawing Figures

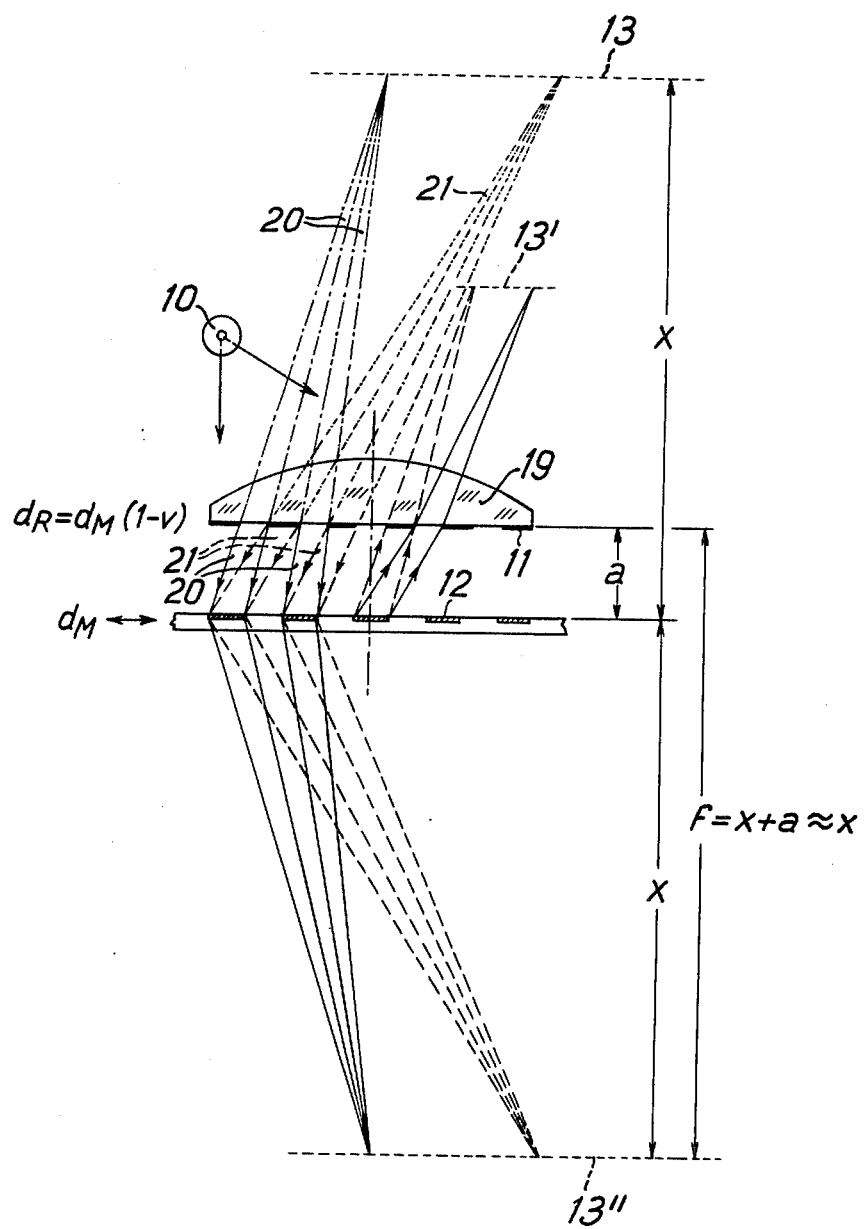

PHOTOELECTRIC INCIDENT LIGHT DISTANCE MEASURING DEVICE

BACKGROUND OF THE INVENTION

The invention concerns a photoelectric distance measuring device, with a source of light, a reflecting scale grating, a reference grating which is transparent and displaceable with respect to the scale grating and which has a different lattice constant, an air space between the two gratings and several photoelectric receivers placed at intervals in the direction of the distance to be measured, said receivers scanning the scale grating via the reference grating.

A distance measuring system in which the scale and reference gratings are aligned with their spacings parallel to each other is known from U.S. Pat. No. 2,886,717. The two gratings display slightly differing lattice constants, and a slight air space is located between the two gratings. Two diaphragm openings are arranged in the path of the illuminating beam emitted by a source of light; two different fields of the grating system are illuminated through the openings.

Distance measurement takes place perpendicularly to the direction of the divisions of both gratings. This creates a strip pattern with strips located parallel to the direction of the spacings of the gratings; the strips travel perpendicularly to the direction of the spacings if the gratings move relatively with respect to each other. The diaphragm openings are located adjacent to each other in the measuring direction and are at a distance from each other so that the image sections of the strip patterns illuminated by them are out of phase with respect to each other by a fraction of one-half of the strip period. Associated with each image section are photoelectric receivers which convert the modulation of the light caused by the movement of the strips into electrical displaced-phase measuring signals.

Because of the special arrangement of the diaphragm openings, it is possible to determine not only the displacement distance of the scale grating, but also the direction of the displacement. Because the measuring signals are derived from light fluxes which had penetrated different partial ranges of the grating system, local differences in the optical properties of these ranges affect the accuracy of the measurement. Specifically, these consist of locally different degrees of soiling and errors in the scale spacings.

The known device uses amplitude gratings as the reference and scale gratings. It is immediately obvious that with a web/gap ratio of 1:1, the optically opaque web of the reference grating even initially suppresses 50% of the illuminating light. To the extent that the web does not entirely absorb this portion of the light, additional interference reflections are created on the part of the receivers. The same percentage loss of light occurs upon the emittance of the light reflected by the scale grating from the measuring system.

SUMMARY OF THE INVENTION

It is therefore the principal object of the present invention to alter the known installation so that similar measuring information can be obtained from a single grating scanning field, so that errors inherent in the system affect both phase shift signals to the same degree and thus become negligible.

Another object of the invention is to provide an arrangement which is illuminated more intensely and largely free of interfering reflections.

In accomplishing the foregoing objects, there has been provided in accordance with the present invention a photoelectric incident light distance measuring device, comprising a light source; a reflecting scale grating; a reference grating with a lattice constant differing from that of the scale grating; said reference grating being transparent and displaceable with respect to the scale grating; an air space between the two gratings; and a plurality of photoelectric receivers placed at intervals in the direction of the distance to be measured for scanning the scale grating through the reference grating whereby vernier strips are produced, and wherein at least two of the photoelectric receivers are arranged approximately at a distance "x", measured in the direction of the light, from the grating with the larger optically effective lattice constant, wherein:

$$x = a/v$$

with a = optically effective air space between the reference and scale gratings;
$v = d_M/(y + d_M) =$ distortion factor;
$y =$ distance of the vernier strips produced by the two gratings;
and with
$d_M$ as the optically effective lattice constant of the scale grating, related to the optically effective lattice constant $d_R$ of the reference grating by the relationship $$d_R = d_M(1 \pm v).$$

The optically effective lattice constant $d_R$ is defined by $d_R = \lambda/\sin\alpha$ where $\alpha$ is the angle between the beams with maximum diffraction intensity. Thus, e.g., a $\lambda/2$ phase grating with cancelled O order diffraction has an optically effective lattice constant corresponding to one-half of its mechanical spacing ($d_R = \frac{1}{2}d$ mechanical).

The further object of the invention is attained by the fact that the reference grating is a phase lattice with a diffraction characteristic which coincides at least approximately with that of the scale grating, taking into consideration the distortion factor v.

An optical cycle difference of approximately one-fourth of the wave length of the effective illuminating light may correspond to the phase variation between the individual structural elements, if the physical lattice constant of the reference grating is equal to the optically effective lattice constant $d_R$.

The difference in lattice constants can be achieved by arranging a lens between the reference and the scale gratings, which, through its magnifying effect, creates an optically effective lattice constant of the scale grating larger than that of the reference grating.

In order to adapt the size of the vernier strip pattern to the photoelectric receiver arrangement, it is convenient to arrange a lens in the path of the beam exiting from the grating system, which produces a reduced image (y') of the vernier strip pattern (y). The focal length f and the position of the lens can be chosen so that a virtual vernier strip pattern coordinated with the grating system is located in the focal plane of the lens.

Further objects, features and advantages of the invention will become apparent from the detailed description of preferred embodiments which follows, when considered together with the attached figures of drawing.

BRIEF DESCRIPTION OF THE DRAWINGS

Several embodiments of the invention are presented schematically in the drawings, as follows:

FIG. 5 shows the creation of the virtual vernier strips;

DETAILED DESCRIPTION OF PREFERRED EMBODIMENTS

Figure 1:
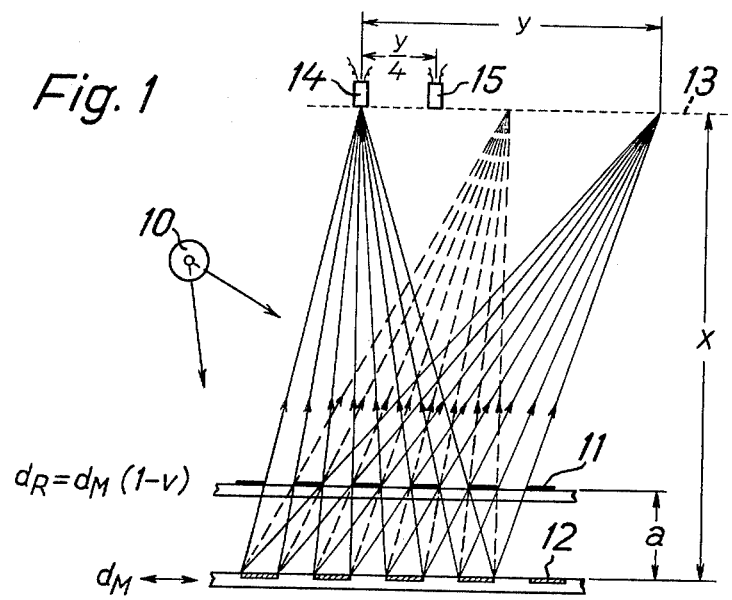
FIG. 1 illustrates an incident light distance measuring device in which the reference grating is an amplitude grating with a slightly smaller lattice constant than that of the scale grating.

In FIG. 1 the light source 10 illuminates in the incident light a grating arrangement consisting of the transparent reference grating 11 and a reflecting scale grating 12. The two gratings are at a distance "a" from each other. The lattice constant of the reference grating 11 is slightly smaller than that of the scale grating, i.e., by a factor of $(1-v)$, where v is a distortion factor with a very low numerical value ($\approx 0.05$).

It was found surprisingly that the effect of the reference grating on the illuminating beam in this case can be entirely neglected during its first passage, if the distance and lattice constant ratios given above are observed. During the first passage through the grating, the reference grating acts exclusively as a diffuser for the illuminating beam. It contributes to the formation of the vernier strip exclusively during the second passage through the grating so that the system can be treated as a true two-grating system.

The system of beams illustrated in FIG. 1 ($d_R = d_M(1-v)$) demonstrates the formation of the vernier strips in a plane 13. The illuminating beams reflected by the grating lines of the scale grating 12 either exit through the gaps of the reference grating 11 from the grating system (solid lines) or they are masked-out by the solid cross-pieces (broken lines). The result is an approximately sinusoidal brightness distribution with explicit maxima and minima in the plane 13. These lines, known as vernier strips, shift in the plane 13 when the scale grating and the reference grating are displaced relative to each other. It is readily seen that the light beams coming from the reflecting web portions of the scale grating move in a direction opposite to the direction of the displacement of the scale grating but in the same direction as the shift of the reference grating.

It is also seen from the geometric path of the beam shown in the figure that the distance x of the plane 13 from the scale grating, which in this case is the grating with the larger lattice constant, is a function of both the ratio of lattice constants and the distance "a" between the gratings. Specifically, the relationship is: $x = a/v$. It can, however, also be shown that the distance between strips "y" (the period of the vernier strip pattern) is independent of "a" and "x" and depends only on the ratio of the lattice constants. Maximum contrast for the vernier strips is obtained at a distance "x". If during the measuring process, the distances "a" and "x" change, this affects only the relative signal amplitudes but not the strip distance "y".

If therefore two photoelectric receivers 14, 15 are arranged at least approximately in the plane 13 at a distance not equal to a multiple integer of y/2, then the receivers will be impacted in periodic intervals, by the light fluxes contained in the vernier strips, during a relative motion between the reference and the scale grating as a function of the direction of the displacement. For electronic signal evaluation, it is advantageous to choose the distance of the two receivers equal to y/4, because then the signal modulation in the two receivers is phase shifted by 90°. Such signals are particularly suitable for evaulation to indicate the direction of the displacement of the gratings.

Figure 2:
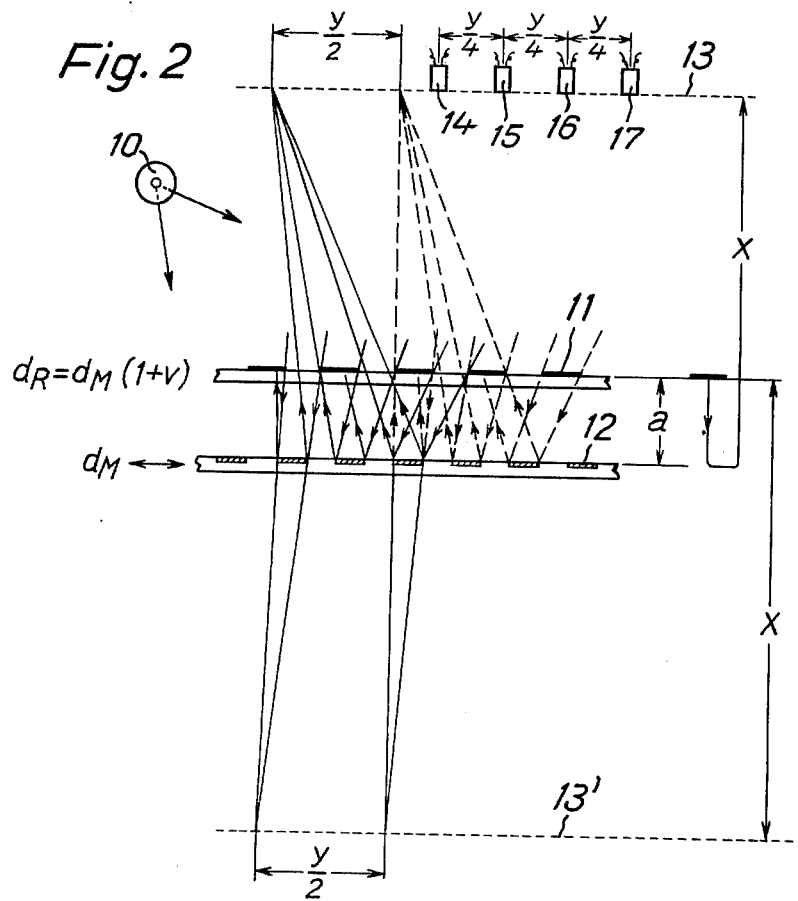
FIG. 2 illustrates an incident light distance measuring device in which the lattice constant of the scale grating is slightly smaller than that of the reference grating.

FIG. 2 (i.e., wherein $d_R = d_M(1+v)$) in principle shows a design identical to the one in FIG. 1, with the difference that here the reference grating 11 has the larger lattice constant. Beginning with the grating with the larger lattice constant, the geometric formation of the vernier strip pattern takes place exactly as in FIG. 1. If the light would pass through the scale grating, the strip pattern would appear at a distance "x" in the plane 13'. Because the scale grating 12 is reflecting, the corresponding beams must be reflected from the web (cross-pieces) of the grating 12, and the strip pattern appears in the plane 13, which beginning at the grating 11 in the direction of the light beams, again has the distance "x". In the plane 13 in this embodiment, four photoelectric receivers 14, 15, 16, 17 are arranged at a distance y/4 apart from each other so that the electric signals obtained are phase shifted by 90° with respect to each other. In a known manner, through push-pull signal evaluation, signal portions not containing signal modulation can be suppressed (even light level).

This arrangement again represents a true two grating system. Grating 11 here acts as a diffusor during the second passage through the grating. This, however, reduces the contrast of the vernier strips through diffraction. In addition, the beam configuration shown makes it clear that part of the light portions of the direction of the bright vernier strips is masked-out by the grating 11. The advantage of the arrangement, however, is its somewhat more compact design.

Figure 3:
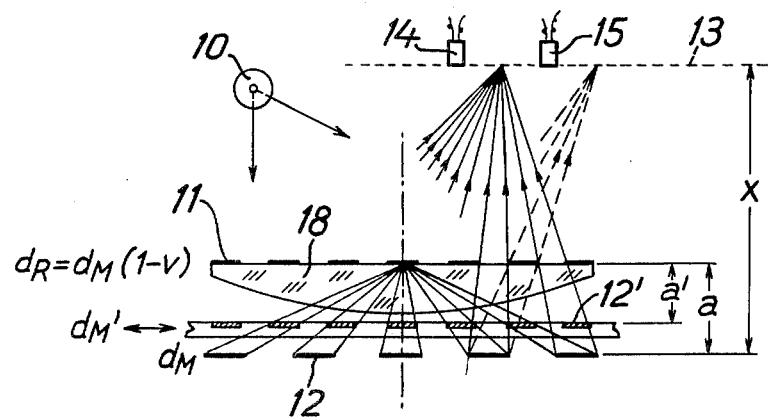
FIG. 3 illustrates a device in which the lattice constant of the scale grating is magnified by magnifying action of a lens.

The design shown in FIG. 3 begins with two gratings 11 and 12', of which it is assumed from the sake of simplicity that their lattice constants are equal. The gratings are at a distance a' from each other, and a lens 18 is arranged between them, having a focal length greater than a'. This lens, through magnification, produces an enlarged image 12 of the scale grating with a lattice constant $d_M$, which represents the optically effective lattice constant to produce the vernier strips. The distance "a" from the grating image 12 to the reference grating is the optically effective distance for the determination of the distance "x", at which the vernier strips of maximum constant are produced. This design has the advantage that, through the choice of the focal length of the lens 18 and by way of the distance a', the effective lattice constant ratio, responsible for the distance of the vernier strips, can be adjusted. The reference grating can be applied directly to the lens 18 by vapor deposition. The lens 18 additionally acts as a field lens for the system and enhances the light intensity of the arrangement.

Figure 4:
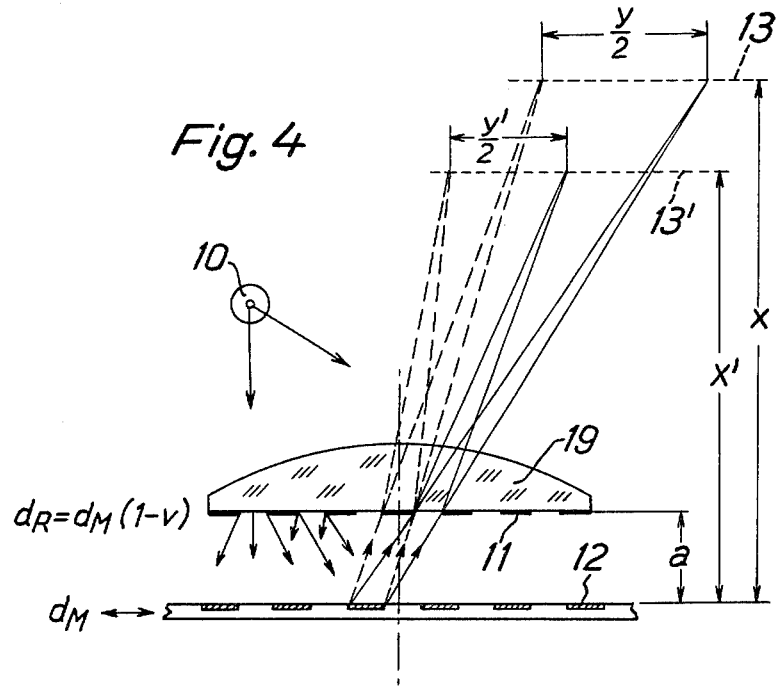
FIG. 4 illustrates a device in which the vernier strip system is optically reduced.

In the arrangement shown in FIG. 4, a lens 19 is arranged between the plane 13 and the reference grating 11 conveniently so that it also serves as the carrier of the reference grating. Based on its diffraction power, it produces a reduced image of the vernier strip pattern in a plane 13'. In this manner, it is possible to adjust the distance of the strips to correspond to a potentially preselected distance of the photoelectric receivers 14, 15, 16, 17. Because the lens in the arrangement shown also has a gathering effect on the illuminating beam emitted by the light source 10, an additional increase in the signal light flux is obtained.

The vernier strips considered heretofore are exclusively real strip patterns. Actually, however, virtual strips are also created, as demonstrated in FIG. 5. In order to understand the phenomenon, one should visualize initially the grating system consisting of $d_R$ and $d_M$ as in FIG. 1, without the lens 19. The system is again illuminated by the light source 10 in cooperation with the grating 11 in a diffuse manner. Beginning with the transparent web of the reference grating, divergent light beams 20 can be chosen, seen in the direction of the light and directed at the reflecting web of the scale grating 12; the beams converge in reverse elongation in the plane 13. The same is true for the beams 21, which emanate from the opaque lattice web of the grating 11. The strip pattern appearing in the plane 11 through the geometric reverse elongation of the designated beams, appears to an observer looking in the direction of the light as a virtual vernier strip pattern in the plane 13'', behind the scale pattern 12, in a position corresponding to the mirror image of the plane 13 on the plane of the grating 12.

The virtual strips can be made visible only with the aid of an optical imaging system. As long as the distance measuring system, as shown in FIG. 1 and 2, operates without imaging lenses, the virtual strips are harmless. Frequently, however, e.g., lenses are inserted in front of the photoelectric receivers to focus the light fluxes to be measured onto the photosensitive surfaces. In the case of arrangements with great focussing depth (gratings with large lattice constants) the real and the virtual strip images, which are also captured, are superposed upon each other. Both strip systems move in opposite directions if the grating move relatively in relation to each other, so that photoelectric evaluation of the moving strip systems becomes impossible. In such a case, it is convenient to chose the focal length f of the lens 19, as shown in FIG. 4, so that the virtual strip plane 13'' and the focal plane coincide. In this manner, the virtual strip pattern is reproduced toward infinity and does not interfere with the evaluation of the signals, because the photoelectric receivers are arranged in the capture plane 13' of the real strip system.

Figure 6A:
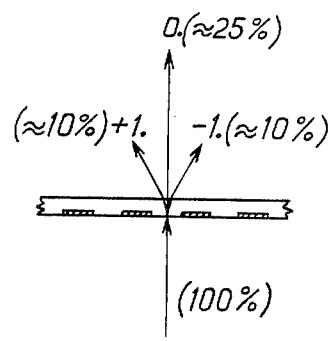
FIG. 6 demonstrates the distribution of intensities in the principal diffraction orders with an amplitude grating.
FIG. 6b illustrates the distribution of intensities in the principal diffraction orders with a phase grating with a phase variation of $\lambda/4$.
Figure 6B:
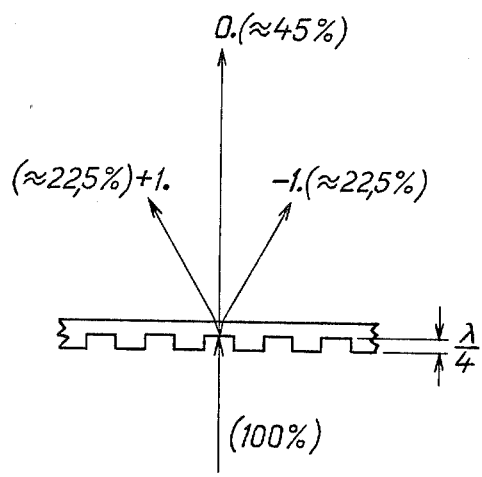

FIGS. 6a and 6b show, in comparison, the light intensities in the principal diffraction orders with a transmitted light amplitude grating and an incident light phase grating. Aside from the unavoidable reflection losses at the air/glass interfaces in the case of the phase grating, virtually all of the incoming light passes through the grating. Each phase grating with a phase variation differing from $\lambda/2$ ($\lambda$=wave length of the effective illuminating light) between the individual structural elements also has light components in the 0 diffraction order. If the phase variation corresponds approximately to $\lambda/4$, it is seen that the light intensities in the +1 and the −1 diffraction order together correspond to the light intensity of the 0 diffraction order. The phase grating therefore behaves over a certain phase variation range with respect to its diffraction characteristic exactly as an amplitude grating with the same lattice constant, with the advantage of a nearly doubled light intensity.

The explanation of the functional principle of the embodiments according to FIG. 1 to 5 was based on a geometricopitcally produced shadow image, which is created through the cooperation of the reference and the scale gratings. Obviously, the strip pattern created could be explained, in a less demonstrative manner, also by wave optical interference between diffracted beams. Such an explanation would also be directly applicable to a design with a phase grating as the reference grating, because the latter has no readily explained "shadows". Because, however, it has been ascertained in the foregoing that under certain conditions the phase grating behaves as an amplitude grating with respect to diffraction, and experimentally confirmed that the phase grating performs a function similar to the amplitude reference grating, here the same method of representation is used as in the principal embodiment of the invention.

Figure 7:
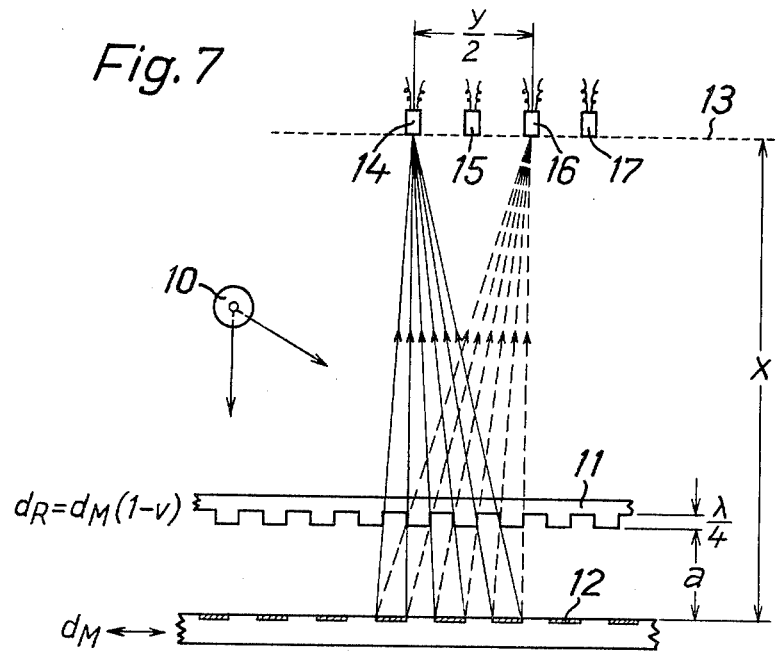
FIG. 7 illustrates an incident light distance measuring device in which the reference grating consists of a phase lattice with a phase variation of $\lambda/4$.

In FIG. 7, the reference grating 11 is a phase grating preferably with a $\lambda/4$ phase variation between the individual structural elements. The measuring system is illuminated, for example, with an intensive light source 10. The light components reflected by the web of the scale grating 12, after interaction with the scale grating 11 produce the vernier strip pattern in the plane 13. In an analogous manner of viewing, it is assumed here that the grooves of the phase grating correspond to the transparent regions of the amplitude grating and that the web corresponds to the opaque regions of the amplitude grating. In the end result, this geometric-optical model concept is in agreement with experiments.

According to the foregoing, a vernier strip system consisting of bright and dark is created with a distance of $y/2$ between the bright and dark strips. Preferably at a distance of $y/4$, in the plane 13, the photoelectric receivers 14, 15, 16, 17 are arranged, which in the case of relative motion between the reference and scale gratings are struck with periodically changing light fluxes, shifting in phase. The electric signals obtained are evaluated in the known manner.

The exemplified embodiments all show linear gratings and distance measuring devices. Naturally, analogous designs with radially divided members can also be chosen for angular measurements.

What is claimed is:

1. A photoelectric incident light distance measuring device, comprising a light source; a reflecting scale grating; a reference grating with a lattice constant differing from that of the scale grating; said reference grating being transparent and displaceable with respect to said scale grating; an air space between the two gratings; said scale grating illuminated through said reference grating; and a plurality of photoelectric receivers placed at intervals in the direction of the distance to be measured for scanning the scale grating through the reference grating whereby vernier strips are produced, and wherein at least two of said photoelectric receivers are arranged approximately at a distance "x", measured in the direction of the light, from the grating with the larger optically effective lattice constant, wherein:

$$x = a/v$$

with
- $a$ = optically effective air space between the reference and scale gratings;
- $v = d_M(y + d_M)$ — distortion factor;
- $Y$ = distance of the vernier strips produced by the two gratings;

and with
- $d_M$ as the optically effective lattice constant of the scale grating, related to the optically effective lattice constant $d_R$ of the reference grating by the relationship $$d_R = d_M(1 \pm v).$$

2. The photoelectric incident light distance measuring device according to claim 1, wherein the reference grating is a phase grating, the diffraction characteristic of which, taking consideration of the distortion factor v, coincides at least approximately with that of the scale grating.

3. The photoelectric incident light distance measuring device according to claim 2, wherein the phase variation between the individual structural elements of the reference grating corresponds to an optical cycle difference of approximately one-fourth of the wave length of the effective illuminating light, and the physically formed lattice constant of the reference grating is equal to the optically effective lattice constant $d_R$.

4. The photoelectric incident light distance measuring device according to claim 1, further comprising a lens arranged between the reference and scale grating which, through magnification, produces an optically effective lattice constant of the scale grating which is larger than that of the reference grating.

5. The photoelectric incident light distance measuring device according to claim 1, further comprising a lens arranged in the path of the beam leaving the grating system, said lens producing a reduced image (y') of the vernier strip pattern (y).

6. The photoelectric incident light distance measuring device according to claim 5, wherein the focal length f and the position of the lens is chosen so that a virtual vernier strip pattern associated with the grating system is located in the focal plane of the lens.

* * * * *